(12) United States Patent
Hill

(10) Patent No.: US 7,279,859 B2
(45) Date of Patent: Oct. 9, 2007

(54) EC MOTOR AND METHOD FOR OPERATING SAME

(75) Inventor: Wolfgang Hill, Karlsruhe (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 221 days.

(21) Appl. No.: 10/976,704

(22) Filed: Oct. 29, 2004

(65) Prior Publication Data

US 2005/0093498 A1 May 5, 2005

(30) Foreign Application Priority Data

Oct. 30, 2003 (DE) ................. 103 50 566

(51) Int. Cl.
*H02P 6/00* (2006.01)
*H02P 6/12* (2006.01)
*H02P 6/14* (2006.01)

(52) U.S. Cl. .................. 318/439; 318/138; 318/254; 318/700; 318/721

(58) Field of Classification Search .................. None
See application file for complete search history.

(56) References Cited

U.S. PATENT DOCUMENTS

| | | | |
|---|---|---|---|
| 5,280,222 A * | 1/1994 | von der Heide et al. | ... 318/138 |
| 5,534,763 A * | 7/1996 | Williams et al. | ............ 318/799 |
| 5,739,650 A * | 4/1998 | Kimura et al. | ............... 318/254 |
| 5,821,708 A * | 10/1998 | Williams et al. | ............ 318/254 |
| 6,498,451 B1 * | 12/2002 | Boules et al. | ................ 318/661 |
| 6,653,829 B1 * | 11/2003 | Henry et al. | ........... 324/207.21 |
| 6,677,724 B1 * | 1/2004 | Kim et al. | ................... 318/700 |
| 6,700,400 B2 * | 3/2004 | Atarashi | ...................... 324/772 |
| 6,791,219 B1 * | 9/2004 | Eric et al. | ................. 310/68 B |
| 6,834,407 B2 * | 12/2004 | Stephens | .................... 318/806 |
| 6,984,957 B2 * | 1/2006 | Tajima et al. | ................ 318/700 |
| 6,989,668 B2 * | 1/2006 | Mayes | .................... 324/207.16 |
| 2004/0061461 A1 * | 4/2004 | Tajima et al. | ................ 318/254 |
| 2004/0104695 A1 * | 6/2004 | Hahn et al. | ................... 318/254 |
| 2004/0128106 A1 * | 7/2004 | Rauer et al. | ................... 702/151 |
| 2004/0232862 A1 * | 11/2004 | Wogari et al. | ............... 318/254 |
| 2004/0245983 A1 * | 12/2004 | Mayes | .................... 324/207.16 |
| 2006/0006822 A1 * | 1/2006 | Kro et al. | .................... 318/254 |
| 2006/0033402 A1 * | 2/2006 | Kim et al. | .................... 310/261 |
| 2006/0125439 A1 * | 6/2006 | Ajima et al. | ................. 318/716 |

\* cited by examiner

*Primary Examiner*—Lincoln Donovan
*Assistant Examiner*—Eduardo Colon
(74) *Attorney, Agent, or Firm*—Davidson, Davidson & Kappel, LLC

(57) ABSTRACT

In a method for operating an EC motor, position-measurement signals are recorded by a position-measuring device, and, on the basis of the position-measurement signals, commutation instants are determined, at which the current supply to the EC motor is commutated. At least one correction value for at least one position-measurement error contained in the position-measurement signals is ascertained and stored. To compensate for the at least one position-measurement error, the correction value is considered when determining the commutation instants.

26 Claims, 5 Drawing Sheets

EC MOTOR AND METHOD FOR OPERATING SAME

Priority is claimed to German Application No. DE 103 50 566.0, filed on Oct. 30, 2003, the entire disclosure of which is incorporated by reference herein.

The present invention is directed to a method for operating an EC (electronically commutated) motor, position-measurement signals being recorded by a position-measuring device, on the basis of the position-measurement signals, commutation instants being determined, the current supply to the EC motor being commutated at the commutation instants. The present invention is also directed to an EC motor having a stator having a polyphase winding, an armature movable relatively thereto having permanent-magnetic poles, and a position-measuring device for recording the position of the poles in relation to the phases of the winding, the position-measuring device having at least one measurement-signal output which is linked to at least one measurement-signal input of a driving device to electronically commutate the EC motor, the driving device having control-signal outputs which are linked via an output stage to the winding in order to control the current supply to the winding phases.

BACKGROUND

An EC motor of this kind having a three-phase stator and an armature designed as a rotor is known in the field. It has a position-measuring device for recording the position of the armature poles in relation to the phases of the winding, which, for each phase, has a Hall-effect sensor that is hardwired to the stator, in response to a relative motion between the stator and the rotor, the Hall-effect sensor being magnetized by the magnetic field of the rotor pole moving past it at the particular moment. In this context, the rotor poles function as an encoder, which, in each of the Hall sensors, generates a magnetic field and thus a Hall voltage which can be used as a position-measurement signal. The measurement-signal outputs of the Hall sensors are linked to a driving device, which, via an output stage, supplies current to the individual phases of the winding in such a way that, between the stator and the rotor, a traveling magnetic field forms that drives the rotor. To achieve a smoothest possible operation and a high torque in such an electronically commutated electric motor, the measurement signals used to commutate the electric motor must reproduce the position of the magnetic poles in relation to the phase in question as accurately as possible.

When the EC motor is manufactured, the actual electric motor, made up of the stator and the rotor, is first fabricated and assembled. The position sensors are subsequently positioned on the stator and electrically connected to the driving device. In particular, when the motor and the Hall sensors are purchased from different manufacturers, positioning errors can occur when positioning the Hall sensors on the stator. This can lead to the measurement signal from several, many, or all of the Hall sensors deviating from the actual position of the rotor relative to the phase assigned to the Hall sensor. To reduce positioning errors of this kind, known methods heretofore provide for making an additional mechanical adjustment of the Hall sensors at the end of the production line. However, this entails a considerable outlay for manufacturing. It is also disadvantageous that the EC motor must be designed in such a way that the Hall sensors are still movable relatively to the stator at the end of the production lines.

SUMMARY OF THE INVENTION

An object of the present invention is to provide an EC motor of the type mentioned at the outset that will be able to be manufactured simply and cost-effectively. An alternate or additional object of the present invention is to provide an EC motor that permits a very precise commutation of its winding currents. A further alternate or additional object of the present invention is to provide a method for operating such an EC motor.

The present invention provides a method wherein at least one correction value for at least one position-measurement error contained in the position-measurement signals is ascertained and stored, and in that the correction value is considered when determining the commutation instants, in order to compensate for the at least one position-measurement error.

This advantageously makes it possible to electronically compensate, in a simple manner, for position-measurement errors contained in the measurement signals of the position-measuring device, so that the need is eliminated for a costly mechanical adjustment of the position-measuring device. Nevertheless, the method makes it possible to commutate the EC motor with a high degree of precision. The correction values may be ascertained during production of the EC motor, for example, and stored in a non-volatile semiconductor memory. During later operation of the EC motor, the correction values may then be simply read out of the semiconductor memory and be used to compensate for the measurement signals and, respectively, for the commutation instants determined from these signals by taking into consideration the relative speed between the armature and the stator.

In one preferred specific embodiment of the present invention, for each phase of the winding of the EC motor, a separate correction value is determined in each case, this correction value being taken into consideration in order to compensate at any one time for a position-measurement error assigned to the phase in question when determining the commutation instants of this phase. This makes it possible to compensate for position-measurement errors caused by incorrect positioning operations and/or by tolerances of the sensor elements assigned to the individual phases, in each case differentiating with respect to the sensor elements. In this way, an even greater measuring accuracy is achieved.

In some instances, it is even possible for a separate correction value to be determined for each pole of the armature of the EC motor and for this correction value to be taken into consideration in order to compensate for a position-measurement error assigned to the pole in question when determining the commutation instants of the phases. Thus, position-measurement errors, which occur due to asymmetries in the armature, may also be included in the consideration. Such asymmetries can be caused, for example, by tolerances in the magnetic material and/or in the dimensions of the permanent magnets and/or by an incorrect positioning of some or several poles of the armature.

An even greater measuring accuracy of the positional measurement may be achieved by ascertaining, for each pole, a number of correction values corresponding to the number of poles and by considering these correction values when determining the commutation instants of the phases, in order to compensate for position-measurement errors.

One particularly advantageous specific embodiment of the method provides for the armature to be moved in relation to the stator, with the winding being at zero current (i.e., de-energized), induction-voltage measurement signals for the electrical voltages induced by the poles in the phases being measured during the relative motion, measurement signals being recorded during the relative motion by position sensors, and the correction values being ascertained by comparing the position-sensor measurement signals with the induction-voltage measurement signals used as reference signals. Thus, the measurement signals are compared directly with the electrical voltages induced in the individual phases by the magnetic poles, thereby enabling the correction values to be determined with a high degree of accuracy. Since the induction-voltage measurement signals are recorded while working with a de-energized winding, interference caused by voltages induced by the winding currents in the winding phases is avoided. In this manner as well, a high degree of precision is made possible when ascertaining correction values.

In one preferred embodiment of the method, during one measuring cycle, the armature, given a winding at zero current, is moved in relation to the stator; during the relative motion, at least one induction-voltage measurement signal being measured for the electrical voltage induced by the poles in at least one phase; during the relative motion, at least one position-measurement signal being recorded by the position-measuring device; and the at least one correction value being ascertained by comparing the at least one position-measurement signal with the at least one induction-voltage measurement signal used as a reference signal, and stored. Thus, the winding of the EC motor fulfills a dual function and, besides being used for generating the rotating or traveling magnetic field, is also used during normal operation of the EC motor for determining a reference signal for measuring the position of the armature in relation to the stator during the measurement or calibration cycle.

It is advantageous when the armature is accelerated to a predefined speed relative to the stator by supplying current to the winding, when the current supply to the EC motor is subsequently interrupted and the measuring cycle is carried out. In this way, it is even possible for the correction values to be determined during operation of the EC motor, at its installation location and, for example, buffer-stored in an EEPROM for later use. Thus, the method according to the present invention makes it possible for the position sensors to be calibrated even during operation of the EC motor, thereby enabling variations in the measurement signal caused by ageing, vibrations, and/or the installation location of the EC motor, to be compensated.

The electrical voltages induced in the phases are advantageously measured against the potential of the star point (i.e., neutral point) of the winding. This renders possible an interference-free measurement of the voltages. Measurement inaccuracies, which may occur during measurement of phase-to-phase voltages, are avoided.

In one advantageous embodiment of the present invention, for at least one phase of the winding, first time-measurement values are recorded for those instants when the induction-voltage measurement signal assigned to this phase has its zero crossings, measuring points in the position-measurement signal of the phase being assigned to the zero crossings; for those instants when these measuring points occur, second time-measurement values being recorded; and first and second time-measurement values, which are assigned to one another, being compared to one another in each case to determine at least one correction value. In the process, it is advantageous that the difference between the first and second time-measurement values, which are assigned to one another respectively, is measured, and, taking into consideration the relative speed between the armature and the stator, i.e., the rotational speed of the armature, converted into a correction angle which corresponds to the deviation of the position indicated by the measurement signal from the actual position of the armature. The first and second time-measurement values may be ascertained in a simple manner using a counter, to whose input a clock signal is applied, in that the counter content is read out at each of the zero crossings. When compensating for the position-measurement errors, taking into consideration the momentary relative speed between the armature and the stator, the correction angle is converted into a time difference which influences the commutation instants.

In one preferred embodiment of the present invention, the induction-voltage measurement signals are compared in each case with a first, positive threshold voltage and with a second, negative threshold voltage, the threshold voltages being selected in such a way that the induction-voltage measurement signals exhibit a greater slope at those locations where they traverse the threshold voltages than in the area of their zero crossings, time-measurement values being recorded for the instants when the induction-voltage measurement signals traverse the threshold voltages, and, from these time-measurement values, the time-measurement value for the zero crossing preferably being determined by interpolation. In this context, a very precise and low-interference detection of the zero-crossing instants is made possible, because the slope of the measurement signal is greater when passing through the threshold voltages than when crossing through zero. The reduced slope in the area of the zero crossings may be caused by a weakening of the magnetic field in the pole gaps situated between the poles, as sensed by a sensor element which is mounted on the stator for detecting the magnetic field of the magnetic poles. The threshold voltages are preferably disposed symmetrically with respect to the zero line.

A plurality of correction values is expediently determined, one after another, a mean value being generated from these correction values and stored, the at least one position-measurement error being compensated using this mean value as a new correction value. By implementing this measure, variations in the ascertained correction values are diminished. It may even be possible, following the mean value generation, for the individual correction values which entered into the mean value generation to be compared with the mean value; should a correction value deviate significantly from the mean value, this correction value being filtered out, and the remaining correction values being used in order to then determine a new mean value that replaces the previously determined mean value.

In one advantageous embodiment of the present invention, the position-measuring device has an encoder which cooperates with at least one sensor element. The encoder has a pattern which, in response to the relative motion between the stator and armature, is scanned by the at least one sensor element; along a path covered during the relative motion, the pattern having periodically recurring, substantially conforming sections and a reference section that differs from these sections; a first correction value being determined at least for the reference section; the armature subsequently being moved in relation to the stator by supplying current to the winding; a plausibility check subsequently being implemented, during which the current supply is interrupted, and a second correction value being determined for the reference section; and the first and second correction values being compared to one another and, in the case of a deviation in the correction values, a commutation error being detected. In this way it is possible to uncover commutation errors during operation of the EC motor, which can be caused, for example, by an error occurring during the counting of pulses contained in the position-measurement signals. Once such a commutation error is discovered, a reference travel to a location of a known position may be implemented in some instances in order to re-initialize the position sensing. The plausibility check enhances the positioning reliability and makes it possible to substantially reduce the number of reference travels that would otherwise be necessary.

The present invention also provides an EC motor of the type mentioned at the outset that includes a driving device having a correction-value memory, in which at least one correction value is stored, to compensate for at least one position-measurement error contained in the measurement signals of the position-measuring device. The driving device also has a compensating device, which communicates with the at least one measurement-signal input, the correction-value memory and the control-signal outputs, in order to compensate for the at least one position-measurement error.

The compensating device advantageously eliminates the need for a costly mechanical adjustment of the position-measuring device during manufacture of the EC motor. However, the winding currents of the EC motor are still commutated with a high degree of precision. The compensating device may have a microcontroller. Microcontrollers of this kind for controlling commutation are commercially available at a reasonable cost for EC motors.

In one preferred embodiment of the EC motor according to the present invention, for each phase, the position-measuring device has one sensor element; in the correction-value memory, one memory location being provided for each correction value assigned to the phase; and the compensating device having one correction-value assignment device for allocating the individual memory locations to the phases. This makes it possible to compensate for position-measurement errors caused by incorrect positioning operations and/or by tolerances of the sensor elements assigned to the individual phases, in each case differentiating with respect to the sensor elements. In this way, an even greater precision is achieved in the commutation of the winding currents.

In one useful embodiment of the present invention, for each pole of the armature, one memory location is provided in the correction-value memory for each correction value assigned to the pole in question, the compensating device having one correction-value assignment device for allocating the individual memory locations to the poles. This makes it possible to allow for position-measurement errors resulting from a malposition of individual poles of the armature, during the commutation.

A more precise commutation may be achieved by providing in the correction-value memory, for each phase, a number of memory locations corresponding to the number of poles of the armature for correction values assigned to each of the poles, and by designing the correction-value assignment device to assign the individual memory locations to the phases and the poles.

The present invention, furthermore, provides an EC motor of the type mentioned at the outset, having a position-measuring device that includes an encoder that cooperates with a sensor element and that features a pattern. The sensor element and the encoder are positioned in such a way that the pattern is scanned by the sensor element in response to the relative motion between the stator and armature. The pattern has at least two types of different pattern sections. The pattern-section types are each assigned to one phase of the winding and the pattern-section types are coordinated with the sensor element in such a way that, in response to the relative motion, they effect different measurement-signal sections in a measurement signal of the sensor element, and that, to allocate the different measurement-signal sections to the individual phases of the winding, the driving device has a device for assigning measurement-signal sections.

This advantageously enables position-measurement values to be recorded for a plurality of phases of the winding using only one single sensor element. A simple design of the EC motor is thereby rendered possible. Moreover, since only one single sensor element is still needed for all phases, the adjustment outlay for the position-measuring device is reduced accordingly in the manufacture of the EC motor. Therefore, the EC motor is able to be manufactured cost-effectively.

In one preferred embodiment of the present invention, the encoder is made of an electrically conductive material, and the sensor element is designed as an eddy-current sensor having one excitation coil and one receiver coil. A sensor element of this kind renders possible a reliable position sensing of the armature in relation to the stator and thus a reliable commutation and positioning of the EC motor, even in an ambient environment in which contamination may occur.

In one advantageous embodiment of the present invention, the pattern is formed by a toothing of the encoder, which has teeth spaced apart from one another by tooth gaps, pattern sections which are assigned to different phases having different dimensions of their teeth and/or tooth gaps that are detectable by the sensor element. In this context, the individual pattern sections are constituted of differently formed toothing sections. Because of their different geometries, these sections are easily distinguished from another, so that, when mounting the encoder on the armature or on the stator, if indicated, it is also possible to optically check for the correct positioning of the encoder on the armature or on the stator.

It is advantageous when the teeth of the toothing have different heights in pattern sections which are assigned to different phases, and when the device for assigning measurement-signal sections is designed in such a way that the pattern sections are assigned as a function of the signal level of the measurement signal. As a result, therefore, the taller teeth feature a shorter distance to the sensor element and thus a greater signal level than do the shorter teeth.

In one advantageous embodiment of the present invention, in pattern sections which are assigned to different phases, the toothing has a different ratio of tooth width to tooth-gap width in the relative motion direction, the device for assigning measurement-signal sections being designed in such a way that the pattern sections are assigned as a function of the mark-to-space ratio of the measurement signal. The sensor element then needs to only distinguish between two signal levels, so that a high level of interference immunity is achieved when acquiring the measurement signals.

In one advantageous embodiment of the present invention, one of the pattern sections is designed as a reference section in such a way that, in response to a relative motion between the stator and the armature, it induces a measurement-signal section in the measurement signal of the sensor element that is distinguished from the measurement-signal sections of the remaining pattern sections of the pattern. The position of the measurement-signal section assigned to the reference section may then be identified in a simple manner in the measurement signal and be compared with a position precalculated by the driving device for the reference section to verify proper commutation of the EC motor.

BRIEF DESCRIPTION OF THE DRAWINGS

Exemplary embodiments of the present invention are explained in greater detail in the following with reference to the drawings, whose figures show.

DETAILED DESCRIPTION

Figure 4:
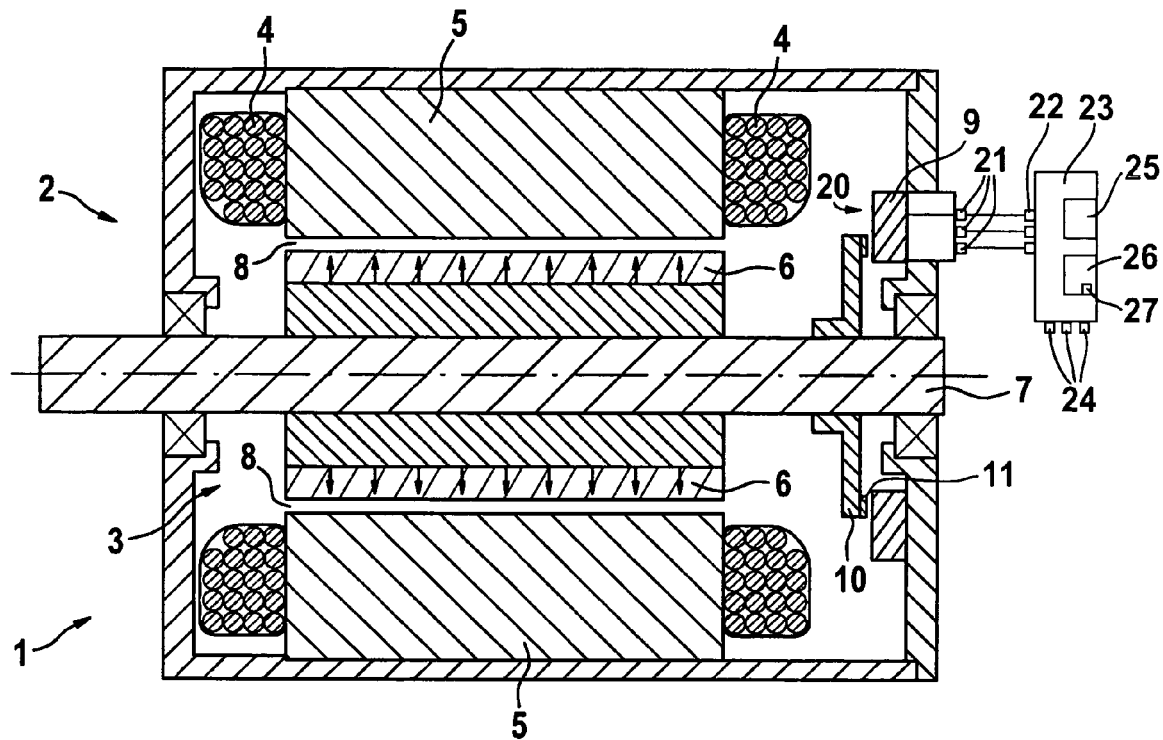
FIG. 4: a longitudinal section through a first exemplary embodiment of an EC motor.
Figure 5:
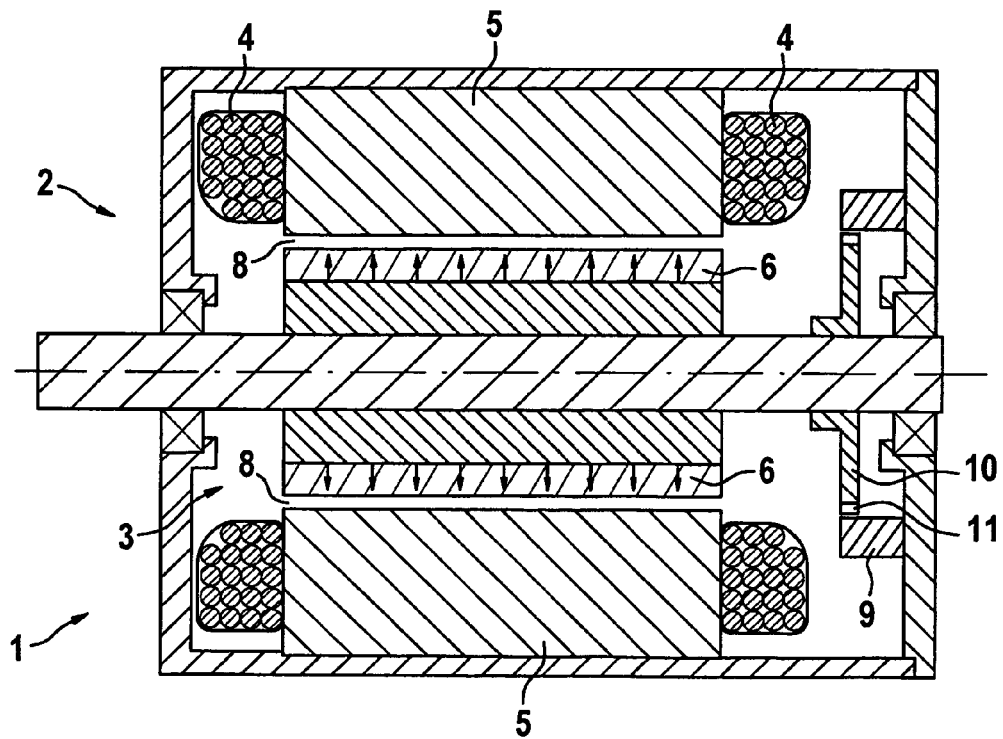
FIG. 5: a longitudinal section through a second exemplary embodiment of an EC motor.

An EC motor denoted as a whole by 1 in FIGS. 4 and 5 has a stator 2 and, rotationally supported relatively thereto, an armature 3 designed as a rotor. Stator 2 has a polyphase winding 4, which passes through slots of a soft magnetic core 5 (laminated stator body). On its periphery, armature 3 has a plurality of permanent-magnetic poles 6, which are offset from one another in the relative motion direction and which are connected via a more or less cylindrical, soft magnetic carrier to a shaft 7. This shaft is rotationally supported by rolling-contact bearings on stator 2. Between soft magnetic core 5 of stator 2 and poles 6, an air gap 8 is formed, which is permeated by a magnetic field.

To record the position of poles 6 in relation to the phases of winding 4, EC motor 1 has a position-measuring device 20 which has a sensor element 9 that is hardwired to stator 2, and an encoder 10 that cooperates with the sensor element and is hardwired to armature 3 and is made of an electrically conductive material. Encoder 10 has a pattern which is formed by a toothing 11 and which, in response to the relative motion between stator 2 and armature 3, is scanned by sensor element 9. In the exemplary embodiment according to FIG. 4, toothing 11 is situated on the end face and, in the exemplary embodiment according to FIGS. 5 through 7, on the periphery of encoder 10.

Sensor element 9 is designed as an eddy-current sensor having one excitation coil fed by an alternating current, and one receiver coil. The excitation coil induces eddy currents in encoder 10 which are dependent on the position of encoder 10 relative to the excitation coil and which attenuate the electromagnetic field of the excitation coil. The attenuation of the electromagnetic field is detected with the aid of the receiver coil in the form of an a.c. voltage. From this a.c. voltage, with the aid of an electronic circuit, a digital position-measurement signal 12a, 12b, 12c is generated in each instance for each phase. It should also be mentioned that, in place of an eddy-current sensor, another position sensor, in particular a Hall sensor, a magnetoresistive sensor, or an optical sensor may also be used.

For each phase, the position-measuring device 20 has one measurement-signal output 21 to which corresponding position-measurement signal 12a, 12b, 12c is applied. In order to electronically commutate EC motor 1, measurement-signal outputs 21 are each linked to a measurement-signal input 22 assigned thereto of a driving device 23 (shown only in FIG. 4). This driving device is connected via an output stage 24 to winding 4 to supply current to the winding phases.

The driving device 23 has a correction-value memory 25 in which correction values are stored for compensating for position-measurement errors contained in the measurement signals of the position-measuring device 20. Moreover, the driving device 23 has a compensating device 26 which compensates for the influence of the position-measurement errors on the instants when the winding currents are commutated, using the correction values stored in the correction-value memory 25. The compensating device 26 has a microcontroller 27 and communicates with the measurement-signal inputs 22, the correction-value memory 25 and the control-signal outputs 24.

Figure 1:
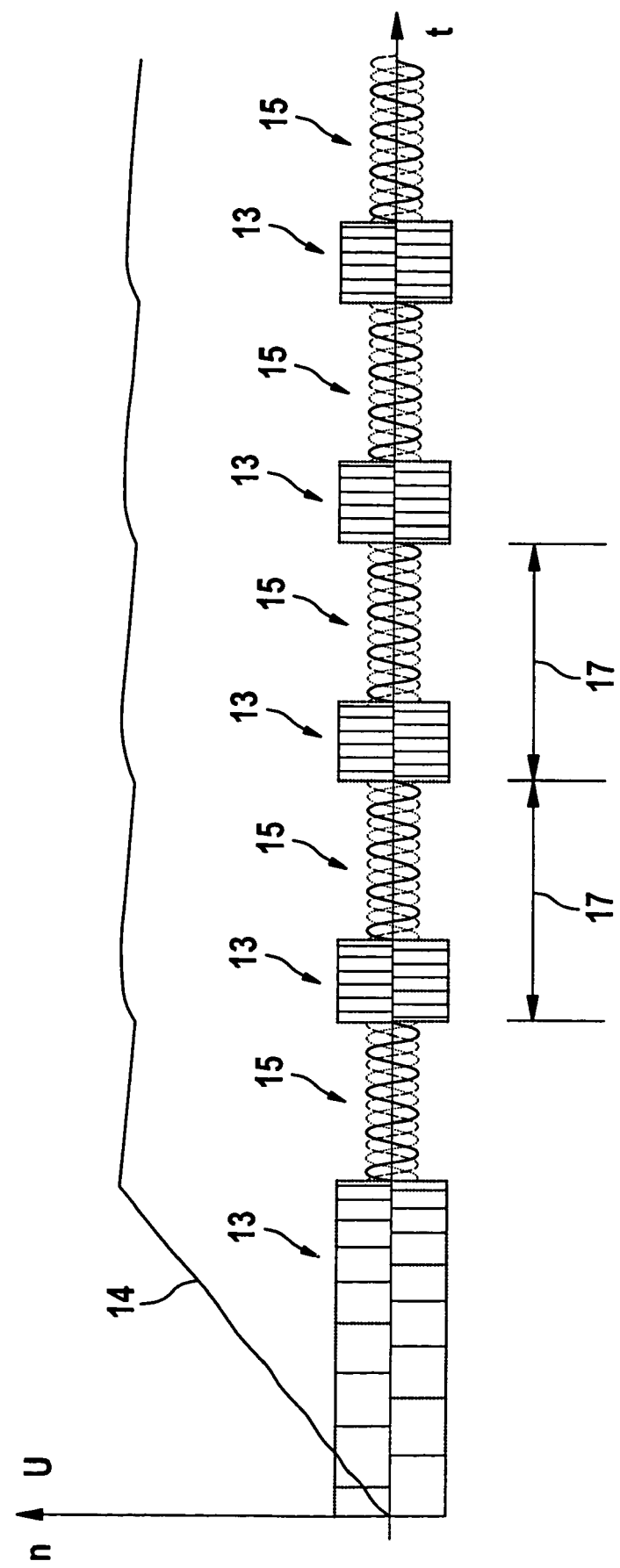
FIG. 1: a graphic representation illustrating the speed characteristic of an EC motor and the characteristic of the phase voltages on its winding, time t being plotted on the abscissa and speed n, i.e., voltage U being plotted on the ordinate.

To determine the correction values, armature 3 is first accelerated to a predefined final speed, using the still uncorrected position-measurement signals 12a, 12b, 12c of sensor elements 9. In the process, in a generally known manner, on the basis of position-measurement signals 12a, 12b, 12c in the microcontroller, commutation instants are precalculated in accordance with which the winding currents are commutated. FIG. 1 graphically depicts characteristic 13 of the electrical voltage applied via the output stage to the individual phases of winding 4.

Moreover, in FIG. 1, speed characteristic 14 of armature 3 is graphically reproduced. It is clearly discernible that, once the current supply to winding 4 begins, the speed initially increases more or less in a ramp shape. The position-measurement errors contained in position-measurement signals 12a, 12b, 12c cause incorrect commutation instants to occur, which lead to torque fluctuations and to an irregular increase in speed that deviates from a straight line.

Figure 2:
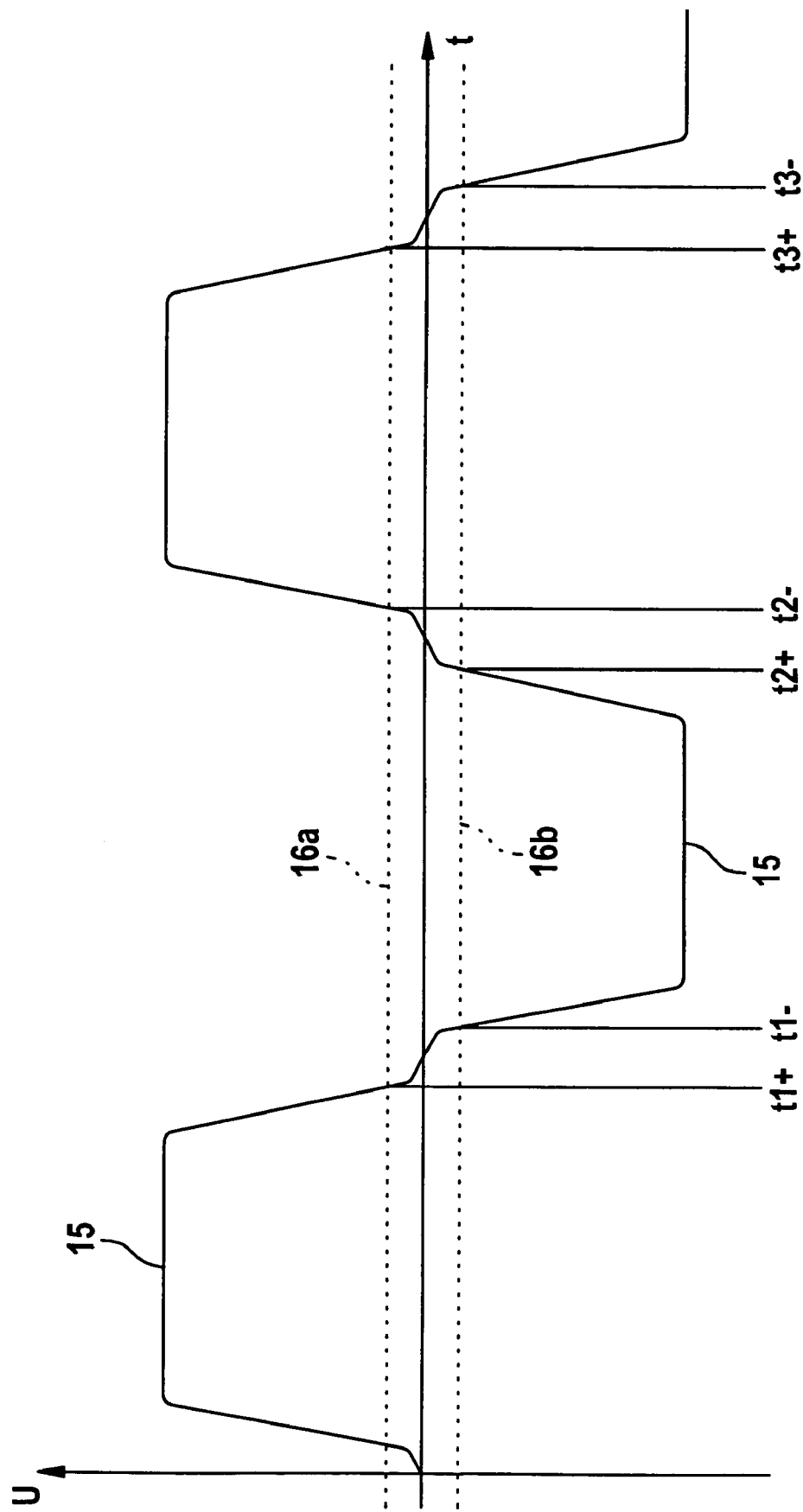
FIG. 2: a graphic representation of the electrical voltage induced by the magnetic poles of the armature in the winding of the stator in response to a relative motion between the stator and the armature, time t being plotted on the abscissa and induced voltage U being plotted on the ordinate.
Figure 3:
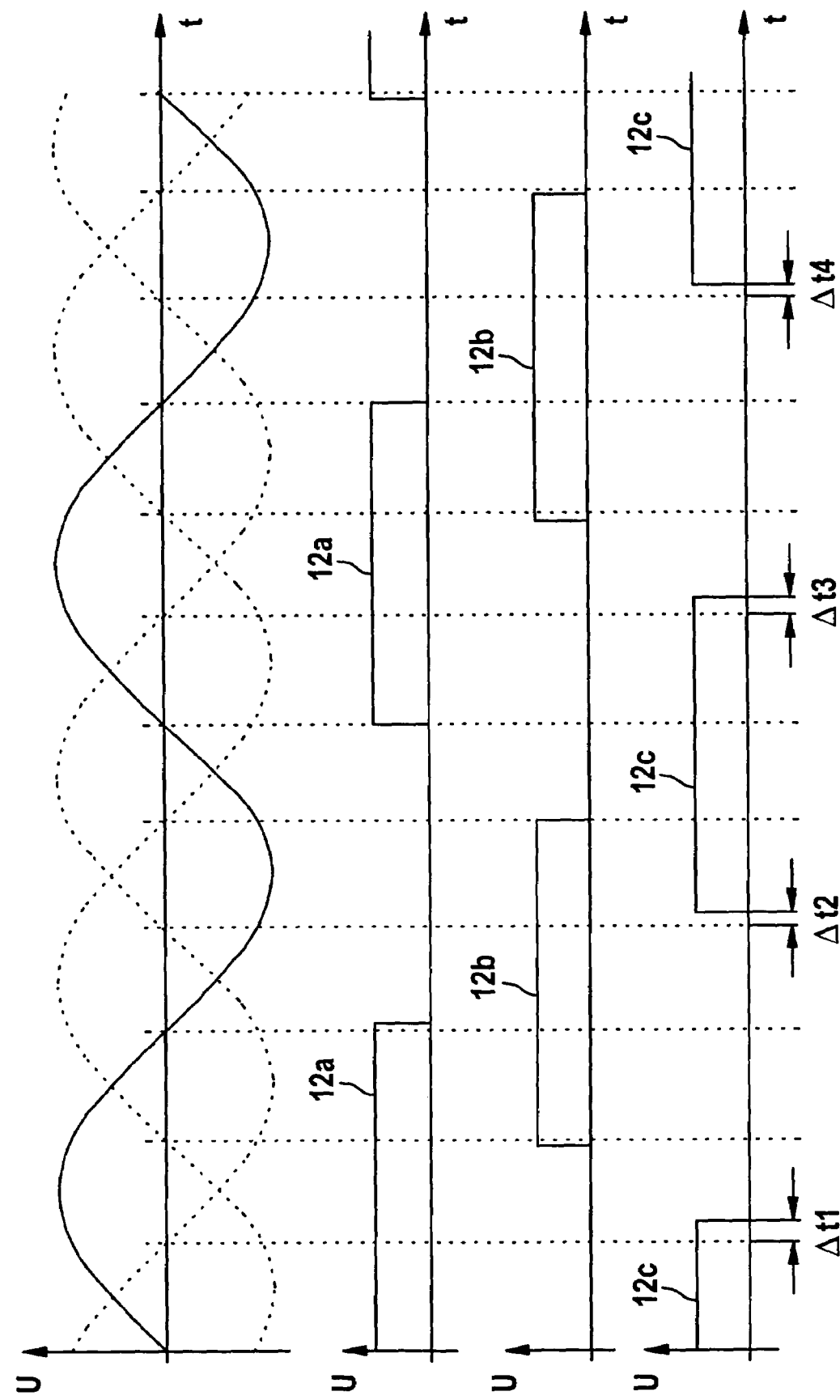
FIG. 3: a graphic representation of the electrical voltage induced by the magnetic poles of the armature in the winding of the stator in response to a relative motion between the stator and the armature of the EC motor, and of the position-measurement signals of a position-measuring device for recording the position of the poles in relation to the phase windings.

Once armature 3 reaches the predefined speed, the current supply to winding 4 is interrupted. During the interruption, armature 3 continues to rotate because of the kinetic energy stored in it, the speed slowly decreasing, however, because of frictional losses. While armature 3 rotates while winding 4 is at zero current, an electrical voltage is induced in the individual phases of the winding in each case by the poles of armature 3. These voltages are measured against the star point of winding 4 using a voltmeter. FIG. 2 graphically depicts a representative induction-voltage measurement signal 15 for one phase of winding 4.

Induction-voltage measurement signal 15 has one zero crossing between mutually adjacent magnetic poles of armature 3 and, approximately centrally located with respect to the magnetic poles, in each case a maximum in terms of actual amount. In this context, positive and negative maxima alternate with one another. Overall, therefore, the characteristic curve of the mutually inducted voltage is approximately symmetrical with respect to the zero line.

Starting out from a maximum and continuing to each subsequent zero crossing, there is initially a relatively steep drop in the amount of the electrical voltage and then a flatter drop near the zero crossing. The flattened curve sections in the area of the zero crossings are caused by weakening of the magnetic field, which is unavoidable in practice, between mutually adjacent magnetic poles of armature 3.

It is discernible in FIG. 2 that the induction-voltage measurement signals of the individual phases are compared in each case with a first, positive threshold voltage 16a and with a second, negative threshold voltage 16b. Threshold voltages 16a, 16b are selected in such a way that induction-voltage measurement signals 15 exhibit a greater slope at those locations where they traverse threshold voltages 16a, 16b than in the area of their zero crossings. For the instants when voltage-measurement signals 15 traverse threshold voltages 16a, 16b, time-measurement values t1+, t2+, t3+, t1−, t2−, t3− are recorded using a counter connected to a clock-pulse generator. In response to each occurrence of voltage-measurement signals 15 traversing threshold voltages 16a, 16b, an interrupt is triggered, during which the counter content of the counter assigned to voltage-measurement signal 15 in question is read out and buffer-stored as second measured value t1+, t2+, t3+, t1−, t2−, t3−. The instant of the zero crossing is determined from a time-measurement value t1+, t2+, t3+ associated in each case with positive threshold voltage 16a and from a chronologically closely adjacent time-measurement value t1−, t2−, t3− associated in each case with negative threshold voltage 16a, in that a mean value is generated. These mean values are stored as first time-measurement values in a first data memory.

Moreover, while armature 3 rotates with winding 4 at zero current, position-measurement signals 12a, 12b, 12c are recorded by the position-measuring device to determine the position of the poles in relation to the phases of winding 4. For each pole pair, position-measurement signals 12a, 12b, 12c exhibit one rising and one falling edge. The instants when these edges occur are measured and stored as second time-measurement values in a second data memory. For each phase, time-measurement errors $\Delta t_1$, $\Delta t_2$, $\Delta t_3$, $\Delta t_4$ are subsequently ascertained in that two chronologically closely adjacent first and second time-measurement values are assigned to one another and, from these time-measurement values, the difference is formed in each case.

In this manner, for each rotation of EC motor 1, one time-measurement error $\Delta t_1$, $\Delta t_2$, $\Delta t_3$, $\Delta t_4$, corresponding in each case to the number of pole pairs, is determined for each position-measurement signal 12a, 12b, 12c and is stored in a third data memory.

A plurality of additional measuring cycles 17 is then carried out, one after another. As is discernible in FIG. 1, at the beginning of each measuring cycle 17, current is supplied in each case to winding 4 until armature 3 again reaches the final speed. The current supply is subsequently interrupted again in each case. During this interruption, further time-measurement errors $\Delta t_1$, $\Delta t_2$, $\Delta t_3$, $\Delta t_4$ are recorded in the above described manner and are stored in additional memory locations of the third data memory provided for that purpose.

Once time-measurement errors have been stored in this manner over a plurality of measuring cycles 17, a mean value is generated for each phase of winding 4 from time-measurement errors $\Delta t_1$, $\Delta t_2$, $\Delta t_3$, $\Delta t_4$ assigned to each of the phases. A correction angle corresponding to the mean value is calculated in each case from the mean values, taking into consideration the speed of EC motor 1 at the time the time-measurement values underlying the time-measurement errors were recorded, and is stored as a correction value in a correction-value memory.

Current is subsequently supplied to winding 4 again, and position-measurement signals are recorded by position-measuring device. Using these position-measurement signals and the stored correction values, taking into consideration the particular speed of EC motor 1, commutation instants are determined, and the current supply to winding 4 is commutated accordingly. In the process, the correction values existing as angles are converted with the aid of the microcontroller into speed-dependent correction times, which are used to compensate for time-measurement errors.

In the exemplary embodiment according to FIG. 4, the pattern of encoder 10 has a number of different pattern sections corresponding to the number of phases of EC motor 1, and the pattern sections are distinguished from one another in that the teeth of toothing 11 differ in length in the axial direction of shaft 7 and are each assigned to one phase of the winding. In response to a relative motion between armature 3 connected to encoder 10 and stator 2 connected to sensor element 9, the teeth of toothing 11 having varying widths produce different signal levels that are distinguishable from one another in the measurement signal of sensor element 9. The measurement-signal sections of the measurement signal having the different signal levels are each assigned to one phase to produce the individual position-measurement signals 12a, 12b, 12c with the aid of a device for assigning measurement-signal sections. In this way, it is possible to generate a number of position-measurement signals 12a, 12b, 12c corresponding to the number of phases, from the measurement signal of sensor element 9.

Figure 6:
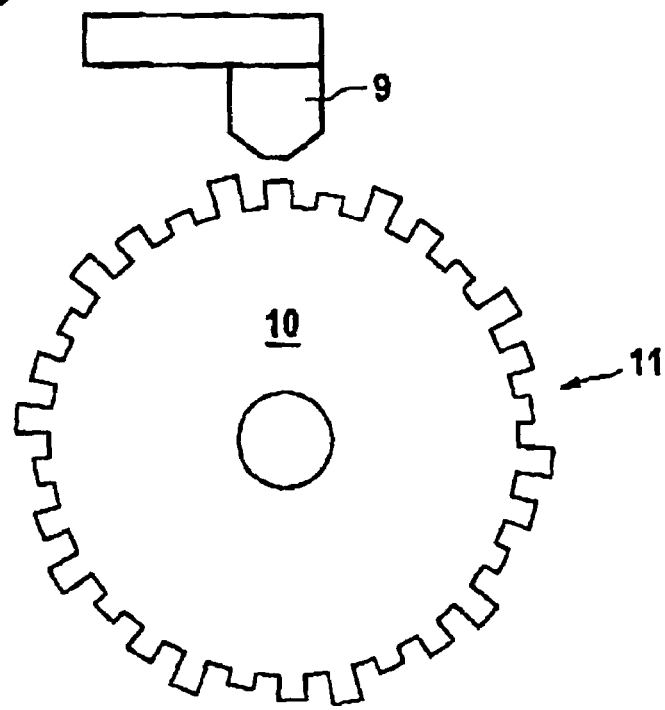
FIG. 6: a plan view of the position-measuring device of the EC motor depicted in FIG. 5.

In the exemplary embodiment illustrated in FIG. 6, the pattern of encoder 10 has a number of different pattern sections corresponding to the number of phases of EC motor 1, and the pattern sections are distinguished from one another in that the teeth of toothing 11 differ in height radially with respect to shaft 7 and are each assigned to one phase of the winding. In the axial direction of shaft 7, the teeth have the same length. In the circumferential direction of encoder 10, the width of the teeth is the same for all of the teeth. In response to a relative motion between armature 3 connected to encoder 10 and stator 2 connected to sensor element 9, the teeth having varying heights produce different signal levels that are distinguishable from one another in the measurement signal of sensor element 9. In this exemplary embodiment as well, the measurement-signal sections of the measurement signal having the different signal levels are each assigned to one phase to generate the individual position-measurement signals 12a, 12b, 12c with the aid of a device for assigning measurement-signal sections.

Figure 7:
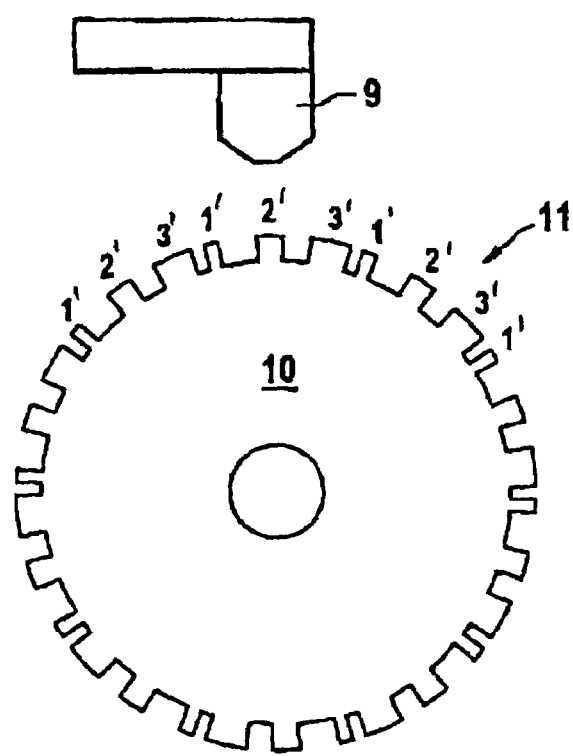
FIG. 7: a plan view of another exemplary embodiment of a position-measuring device.

In the exemplary embodiment according to FIG. 7, the pattern sections (1', 2', 3') assigned to the individual phases have a different ratio of tooth width to tooth-gap width in the circumferential direction of encoder 10. In this context, the width of the pattern sections is constant over the circumference of encoder 10, i.e., pattern sections, which have wide teeth, have narrow tooth gaps and vice versa. Axially and radially with respect to shaft 7, the teeth each have the same dimensions. The device for assigning measurement-signal sections is designed in such a way that the pattern sections are assigned in each case as a function of the ratio of the length of the particular tooth to the length of the tooth gap adjacent thereto (mark-to-space ratio) of the measurement signal.

What is claimed is:

1. A method for operating an EC motor, comprising:
recording a plurality of position-measurement signals using a position-measuring device;
ascertaining at least one correction value for at least one position-measurement error contained in the position-measurement signals;
storing the at least one correction value;
determining commutation instants based on the position-measurement signals and taking into account the at least one correction value so as to compensate for the at least one position-measurement error; and
commutating current supply to the EC motor at the commutation instants.

2. The method as recited in claim 1, wherein the EC motor includes a winding having a plurality of phases, wherein the at least one correction value includes a separate correction value corresponding to each of the plurality of phases, and wherein the determining of the commutation instants is performed for each of the plurality of phases, taking into account a respective separate correction value for each phase so as to compensate for a respective position measurement signal corresponding to the phase.

3. The method as recited in claim 2, wherein the EC motor includes an armature having a plurality of poles, wherein the at least one correction value includes a separate correction value corresponding to each of the plurality of poles, and wherein the determining of the commutation instants is performed for each of the plurality of poles, taking into account a respective separate correction value for each pole so as to compensate for a respective position measurement signal corresponding the pole.

4. The method as recited in claim 2, wherein a number of correction values corresponding to the number of poles is ascertained for each phase, and wherein the determining of the commutation instants of the phases is performed taking into account the number of correction values so as to compensate for position-measurement errors.

5. The method as recited in claim 1, wherein the EC motor includes a stator, a winding, and an armature, and wherein the recording of the plurality of position-measurement signals includes: causing a relative motion between the armature relative and the stator when the winding has zero current,
measuring at least one induction-voltage measurement signal for an electrical voltage induced by the poles in at least one phase during the relative motion, and
recording the at least one position-measurement signal using the position-measuring device during the relative motion, and wherein the ascertaining of the at least one correction value is performed by comparing the at least one position-measurement signal with the at least one induction-voltage measurement signal.

6. The method as recited in claim 5, wherein the causing of the relative motion is performed by accelerating the armature to a predefined speed relative to the stator by supplying a current to the winding and then interrupting the current supply to the winding.

7. The method as recited in claim 5, wherein the measuring of the at least one induction-voltage measurement signal includes measuring the electrical voltage induced in the phase against the potential at a star point of the winding.

8. The method as recited in claim 5, wherein the recording of the at least one position-measurement signal includes:
recording a plurality of first time-measurement values for each instant when the induction-voltage measurement signal assigned to the at least one phase has a zero crossing;
assigning a plurality of measuring points in the position-measurement signal of the phase to the zero crossings; and
recording a plurality of second time-measurement values, each corresponding to one of the plurality of measuring points, and wherein the ascertaining of the at least one correction value is performed by comparing each of the plurality of first time-measurement values to a respective one of the plurality of second time-measurement values.

9. The method as recited in claim 8, further comprising:
comparing the induction-voltage measurement signal with a first, positive threshold voltage and with a second, negative threshold voltage; the threshold voltages being defined as the voltages at which the induction-voltage measurement signal exhibits a slope greater than a slope in the area of the zero crossing; and
recording a positive time-measurement values for the instant when the induction-voltage measurement signal traverses the first, positive threshold voltage;
recording a negative time-measurement value for the instant when the induction-voltage measurement signal traverses the second, negative threshold voltage; and
determining the time-measurement value for the zero crossing from the positive and negative time-measurement values by interpolation.

10. The method as recited in claim 1, wherein the ascertaining of the at least one correction value includes ascertaining a plurality of correction values, one after another, and further comprising generating a mean value from the plurality of correction values; and wherein the compensating for the at least one position-measurement is performed using the mean value.

11. The method as recited in claim 10, wherein the EC motor includes a stator, a winding, and an armature and wherein the position-measuring device includes an encoder having a pattern cooperating with at least one sensor element configured to scan the pattern during a relative motion between the stator and the armature, wherein the pattern has a plurality of substantially conforming sections and a reference section recurring along a path covered during the relative motion, the reference section differing from the plurality of substantially conforming sections, and wherein the method further comprises:
determining a first correction value for the reference section;
subsequently moving the armature relative to the stator by supplying current to the winding;
performing a plausibility check including interrupting the current supply and determining a second correction value for the reference section;
comparing the first and second correction values to one another; and
detecting the commutation error in the case of a deviation in the first and second correction values.

12. An EC motor comprising:
a stator having a winding including a plurality of phases;
an armature movable relative to the stator and having a plurality of permanent-magnetic poles;
a driving device having at least one measurement-signal input and a plurality of control-signal outputs linked via an output stage to the winding so as to control a current supply to the winding phases; and a position-measuring device for recording a position of the poles relative to the phases of the winding and having at least one measurement-signal output linked to the at least one measurement-signal input to carry a plurality of measurement signals for electronically commutate the EC motor;

wherein the measurement signals contain at least one position-measurement error, wherein the driving device has a correction-value memory for storing at least one correction value, and wherein the driving device has a compensating device communicating with the at least one measurement-signal input, the correction-value memory and the control-signal outputs, to compensate for the at least one position-measurement error.

13. The EC motor as recited in claim 12, the position-measuring device has one sensor element for each of the plurality of phases of the winding, wherein the at least one correction value includes a correction value corresponding to each of the plurality of phases, wherein the correction-value memory includes a memory location for each correction value, and wherein the compensating device includes a correction-value assignment device for allocating each of the correction values of a corresponding one of the memory locations for each of the phases.

14. The EC motor as recited in claim 12, wherein the at least one correction value includes a correction value corresponding to each of the plurality of poles, wherein the correction-value memory includes a memory location for each correction value, and wherein the compensating device includes a correction-value assignment device for allocating each of the memory locations to a respective one of the poles.

15. The EC motor as recited in claim 12, wherein the correction-value memory includes a number of memory locations corresponding to the number of poles for each phase for correction values assigned to each of the poles, and the compensating device includes a correction-value assignment device for allocating each of the memory locations to each of the phases of the poles.

16. The EC motor as recited in claim 12, wherein the compensating device includes a voltmeter for measuring an induced electrical voltage induced by the magnetic poles in response to a relative motion between the stator and the armature in the phases of the winding, wherein the voltmeter has measuring inputs connected to electrical terminals of the phases, and wherein the compensating device includes a comparator linked to at least one measurement-signal output of the voltmeter and to the at least one measurement-signal output of the position-measuring device so as to compare the induced electrical voltages with position-measurement signals of the position-measuring device.

17. The EC motor as recited in claim 16, wherein the voltmeter includes at least one further measuring input connect to a star point of the winding.

18. The EC motor as recited in claim 12, wherein the position-measuring device includes an encoder having a pattern and a sensor element, the encoder positioned relative to the sensor element and in such a way that the pattern is scanned by the sensor element in response to the relative motion between the stator and the armature, wherein the pattern has at least two types of different pattern sections, each assigned to one phase of the winding, wherein the pattern-section types are coordinated with the sensor element so that each effects a different measurement-signal section in a measurement signal of the sensor element during the relative motion, and wherein the driving device includes a assigning device for allocating each of the different measurement-signal sections to the corresponding phase.

19. The EC motor as recited in claim 18, wherein the encoder includes an electrically conductive material, and the sensor element includes an eddy-current sensor having an excitation coil and a receiver coil.

20. The EC motor as recited in claim 18, wherein the pattern is formed by a toothing of the encoder having a plurality of teeth spaced apart from one another by tooth gaps, and wherein the pattern sections have different dimensions of one of the corresponding teeth and the corresponding teeth gaps, the different dimensions being detectable by the sensor element.

21. The EC motor as recited in claim 20, wherein the plurality of teeth are positioned radially with respect to an axis of rotation of the armature.

22. The EC motor as recited in claim 20, wherein the plurality of teeth are positioned in parallel with respect to an axis of rotation of the armature.

23. The EC motor as recited in claim 18, wherein the pattern is formed by a toothing of the encoder having a plurality of teeth having different heights according to the pattern sections assigned to different phases, and wherein the assigning device is configured to assign the pattern sections as a function of a signal level of the measurement signal.

24. The EC motor as recited in claim 18, wherein the pattern is formed by a toothing of the encoder having a plurality of teeth having different lengths in a direction transverse to the relative motion direction according to the pattern sections assigned to different phases, and wherein the assigning device is configured to assign the pattern sections as a function of a signal level of the measurement signal.

25. The EC motor as recited in claim 18, wherein the pattern is formed by a toothing of the encoder having a plurality of teeth, each having a tooth width spaced apart from one another by a tooth-gap having a tooth-gap width, and wherein the pattern sections have different ratios of tooth width to tooth-gap width in the relative motion direction, and wherein the assigning device is configured to assign the pattern sections as a function of a mark-to-space ratio of the measurement signal.

26. The EC motor as recited in claim 18, at least one of the pattern sections is a reference section and is configured to induce in the sensor element a reference measurement signal section in the measurement signal that is distinguished from measurement-signal sections the remaining pattern sections.

* * * * *